US005664124A

United States Patent [19]
Katz et al.

[11] Patent Number: 5,664,124
[45] Date of Patent: Sep. 2, 1997

[54] BRIDGE BETWEEN TWO BUSES OF A COMPUTER SYSTEM THAT LATCHES SIGNALS FROM THE BUS FOR USE ON THE BRIDGE AND RESPONDS ACCORDING TO THE BUS PROTOCOLS

[75] Inventors: Sagi Katz, Haifa, Israel; William Alan Wall; Amy Kulik, both of Austin, Tex.; Daniel R. Cronin, III, Lake Worth, Fla.

[73] Assignee: International Business Machines Corporation, Armonk, N.Y.

[21] Appl. No.: 351,186

[22] Filed: Nov. 30, 1994

[51] Int. Cl.[6] ................................................ G06F 13/00
[52] U.S. Cl. ............................................................ 395/309
[58] Field of Search ........................ 395/200.02, 200.2, 395/825, 856, 885, 287, 306, 309, 726, 728, 775, 800; 370/85.1, 85.9, 85.13; 340/825.5

[56] References Cited

U.S. PATENT DOCUMENTS

| 4,864,496 | 9/1989 | Triolo et al. | 364/200 |
|---|---|---|---|
| 5,341,495 | 8/1994 | Joyce et al. | 395/500 |
| 5,455,915 | 10/1995 | Coke | 395/293 |
| 5,519,872 | 5/1996 | Khandekar et al. | 395/775 |
| 5,522,050 | 5/1996 | Amini et al. | 395/306 |
| 5,533,204 | 7/1996 | Tipley | 395/288 |
| 5,535,341 | 7/1996 | Shah et al. | 395/306 |
| 5,548,730 | 8/1996 | Young et al. | 395/280 |

*Primary Examiner*—Alpesh M. Shah

[57] ABSTRACT

A computer system having an ISA bus and a PCI bus is provided with a PCI to ISA bridge having certain imbedded functions performed by PCI slaves on the bridge. In order to implement the bridge in slow CMOS technology, the PCI control signals are latched on the bridge. Since the PCI slaves on the bridge cannot respond with control signals on the PCI bus fast enough to satisfy the PCI bus protocol due to this latching, a logic device is provided on the bridge. The logic device monitors the unlatched master-slave control signals carried on the PCI bus, and in appropriate situations, drives the control signals on the PCI bus (within the time specified by the PCI bus protocol) that the PCI slaves would normally drive but are unable to within the time necessary to meet the PCI bus protocol.

18 Claims, 8 Drawing Sheets

BRIDGE BETWEEN TWO BUSES OF A COMPUTER SYSTEM THAT LATCHES SIGNALS FROM THE BUS FOR USE ON THE BRIDGE AND RESPONDS ACCORDING TO THE BUS PROTOCOLS

BACKGROUND OF THE INVENTION

1. Field of the Invention

The present invention relates to the field of digital computer systems, and more particularly, to a bus interface (a bridge) between two busses.

2. Description of Related Art

In computer systems, electronic chips and other components are connected with one another by buses. A variety of components can be connected to the bus providing intercommunication between all of the devices that are connected to the bus. One type of bus which has gained wide industry acceptance is the industry standard architecture (ISA) bus. The ISA bus has twenty-four (24) memory address lines which therefore provides support for up to sixteen (16) megabytes of memory. The wide acceptance of the ISA bus has resulted in a very large percentage of devices being designed for use on the ISA bus. However, higher-speed input/output devices commonly used in computer systems require faster buses.

A solution to the general problem of sending and receiving data from the processor to any high-speed input device is a local bus. Unlike the ISA bus, which operates relatively slowly with limited bandwidth, a local bus communicates at system speed and carries data in 32-bit blocks. Local bus machines remove from the main system bus those interfaces that need quick response, such as memory, display, and disk drives. One such local bus that is gaining acceptance in the industry is the peripheral component interconnect (PCI) bus. The PCI bus can be a 32 or 64-bit pathway for high-speed data transfer. Essentially, the PCI bus is a parallel data path provided in addition to an ISA bus. The system processor and memory can be attached directly to the PCI bus, for example. Other devices such as graphic display adapters, disk controllers, sound cards, etc. can also attach directly or indirectly (e.g., through a host bridge) to the PCI bus.

A bridge chip is provided between the PCI bus and the ISA bus in order to provide communication between devices on the two buses. The bridge chip essentially translates the ISA bus cycles to PCI bus cycles, and vice versa.

Many of the devices attached to the PCI bus and the ISA bus are "master" devices that can conduct processing independently of the bus or other devices. Certain devices coupled to the buses are considered to be "slaves" or "targets" that accept commands and respond to requests of a master. Many devices are able to serve as both a master and a slave in certain circumstances.

It is desirable to provide the bridge chip between the PCI bus and the ISA bus with certain functionality, such as scatter/gathering, integrated drive electronics (IDE) interfacing, PCI arbitration, etc. For at least some of these purposes, the bridge chip contains slaves. These slaves need to respond to the PCI bus according to the PCI bus protocol, set forth in the PCI Specification, herein expressly incorporated by reference. However, to provide the desired functionality in the bridge chip within the specified response time required by the PCI bus is problematical if the bridge chip is implemented in a relatively inexpensive and slower technology, such as a 0.8 micron CMOS technology. The problem arises due to the need to latch the signals that are received from the PCI bus as inputs to the bridge chip as well as those signals sent to the PCI bus from the bridge chip to allow the slaves implemented in the slower technology to make use of the signals. The two clock latency created by the latching is incompatible with the PCI bus protocol.

SUMMARY OF THE INVENTION

There is a need for a system which uses a bridge chip that provides desired functionality, and while implemented in a relatively slower technology, is able to maintain the PCI bus protocol.

These and other needs are met by the present invention which provides a bridge coupled between first and second buses for interfacing the first and second buses, the second bus carrying master-slave control signals and having a master coupled to the bus and a specified bus protocol. The bridge comprises an internal latched third bus carrying latched master-slave control signals, at least one slave, and a latch coupled between the second and third buses. This latch latches the master-slave control signals received from the second bus and the latched master-slave control signals received from the third bus. The bridge has a logic device coupled between the second and third buses, the logic device monitoring the states of the control signals on the second bus and driving at least one of the control signals on the second bus according to the bus protocol in response to certain predetermined states of the monitored control signals.

In certain preferred embodiments of the invention, the second bus is a peripheral controller interconnect (PCI) bus, and the bus protocol is a PCI bus protocol.

The present invention provides the cost advantages of a bridge that can be implemented in 0.8 micron CMOS technology, since the control signals to and from the PCI bus are latched for the PCI slaves on the bridge. At the same time, however, PCI bus protocol is maintained by the logic device that monitors the unlatched control signals and responds to predetermined states of the control signals according to the PCI bus protocol. This frees the PCI slaves from having to respond under certain circumstances with control signals on the PCI bus within the time periods specified by the PCI bus protocol.

The foregoing and other objects, features, aspects and advantages of the present invention will become more apparent from the following detailed description of the present invention when taken in conjunction with the accompanying drawings.

DESCRIPTION OF THE ILLUSTRATIVE EMBODIMENT(S)

Figure 1:
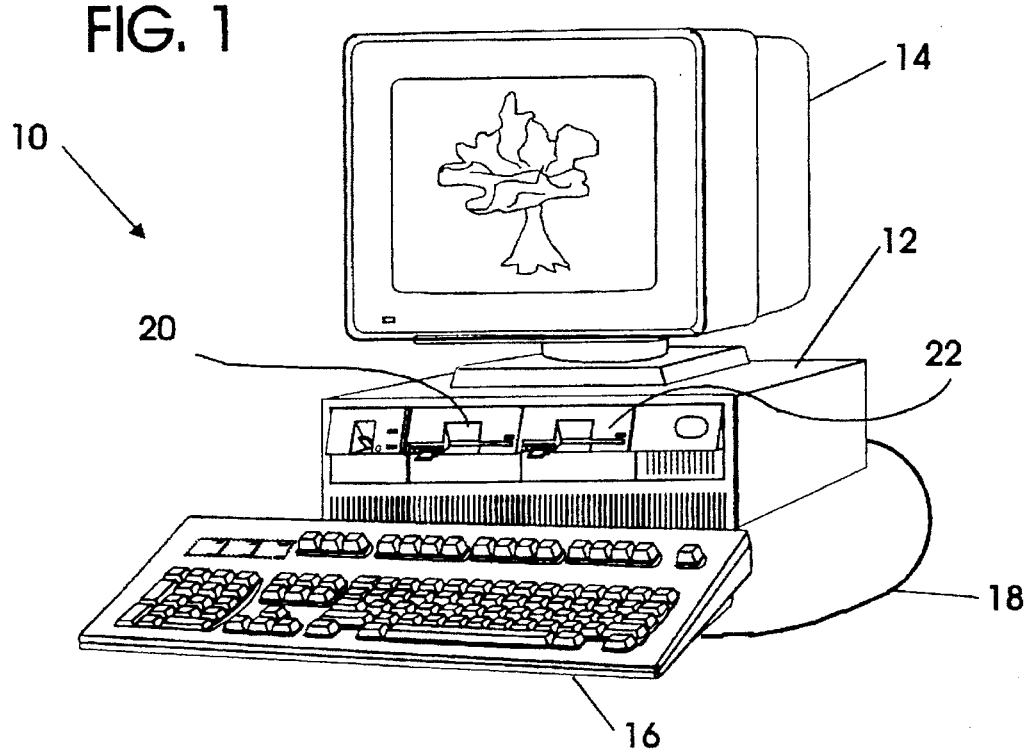
FIG. 1 is a perspective view of a computer system of the present invention.

With reference now to the Figures and in particular with reference to FIG. 1, a conventional computer, or PC, designated 10, is of the environment to which the invention has particular utility. Computer 10 which preferably, but not necessarily, is of a type utilizing an IBM personal computer or a similar system, includes a console housing 12 in which a circuit board containing the necessary circuitry including a microprocessor and BIOS chips, controllers, random access memory and other hardware are arranged. The computer will also include a video display 14 and a keyboard 16 connected to the housing 12 through cable 18. Mass storage media includes a hard disk drive within the housing and is non-accessible to the user, and user-accessible floppy disks, as well as, optionally, CD-ROM drives 20 and 22.

Figure 2:
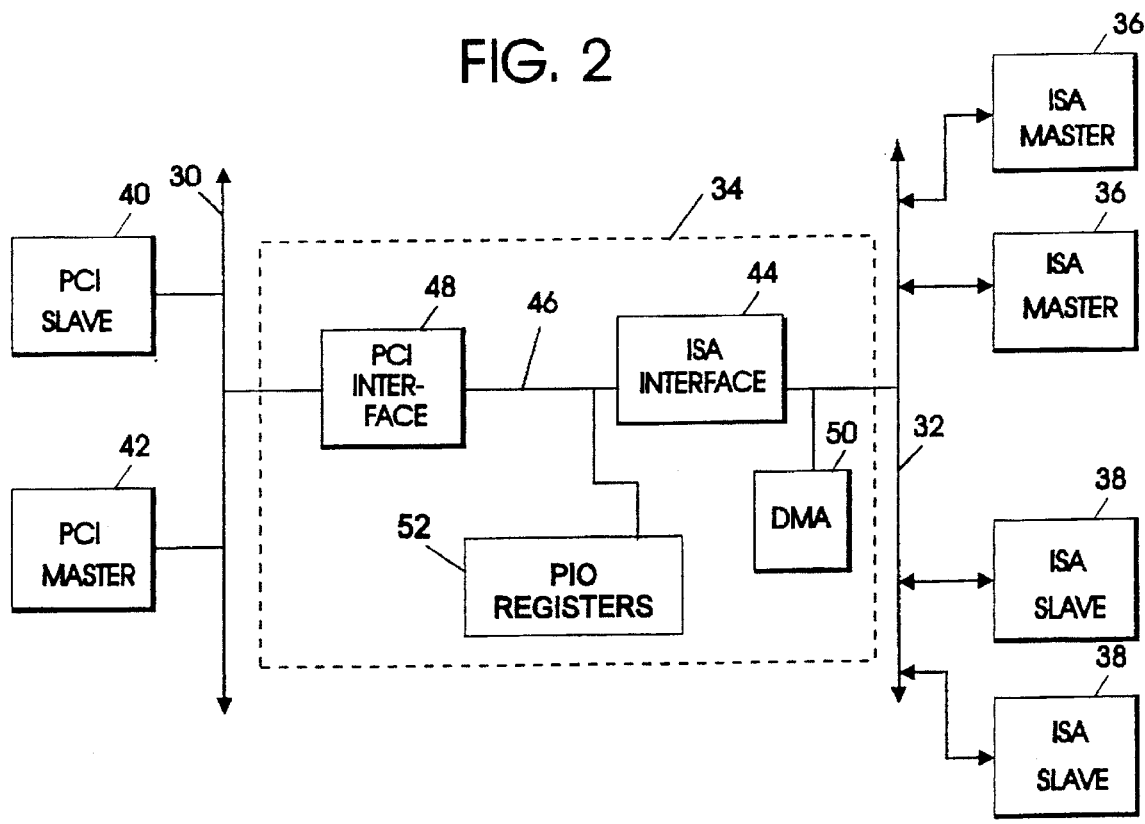
FIG. 2 is a block diagram of the computer system of FIG. 1 constructed in accordance with an embodiment of the resent invention.

FIG. 2 is a block diagram of a computer system constructed in accordance with an embodiment of the present invention. The system includes a PCI bus 30, an ISA bus 32, with a plurality of ISA masters 36 and ISA slaves 38. A plurality of PCI memory slaves 40 (known as "targets" in the PCI protocol, but henceforth referred to as slaves) and PCI masters 42 are coupled to the PCI bus 30.

The bridge chip 34 contains an ISA interface 44 coupled between the ISA bus 32 and an internal system bus 46. A PCI interface 48 is provided between the PCI bus 30 and the system bus 46. The bridge chip 34 also has a DMA controller 50 and programmable I/O (PIO) registers 52. Among other functions, the bridge chip 34 provides an interface between the PCI bus 30 and the ISA bus 32. The ISA interface 44 translates ISA bus cycles into a system bus cycle for use by the bridge chip 34. Among other functions, the PCI interface 48 converts PCI bus cycles from the PCI bus 30 into system bus cycles for the bridge chip 34. The DMA controller 50 provides DMA control of memory accesses within the system.

Figure 3:
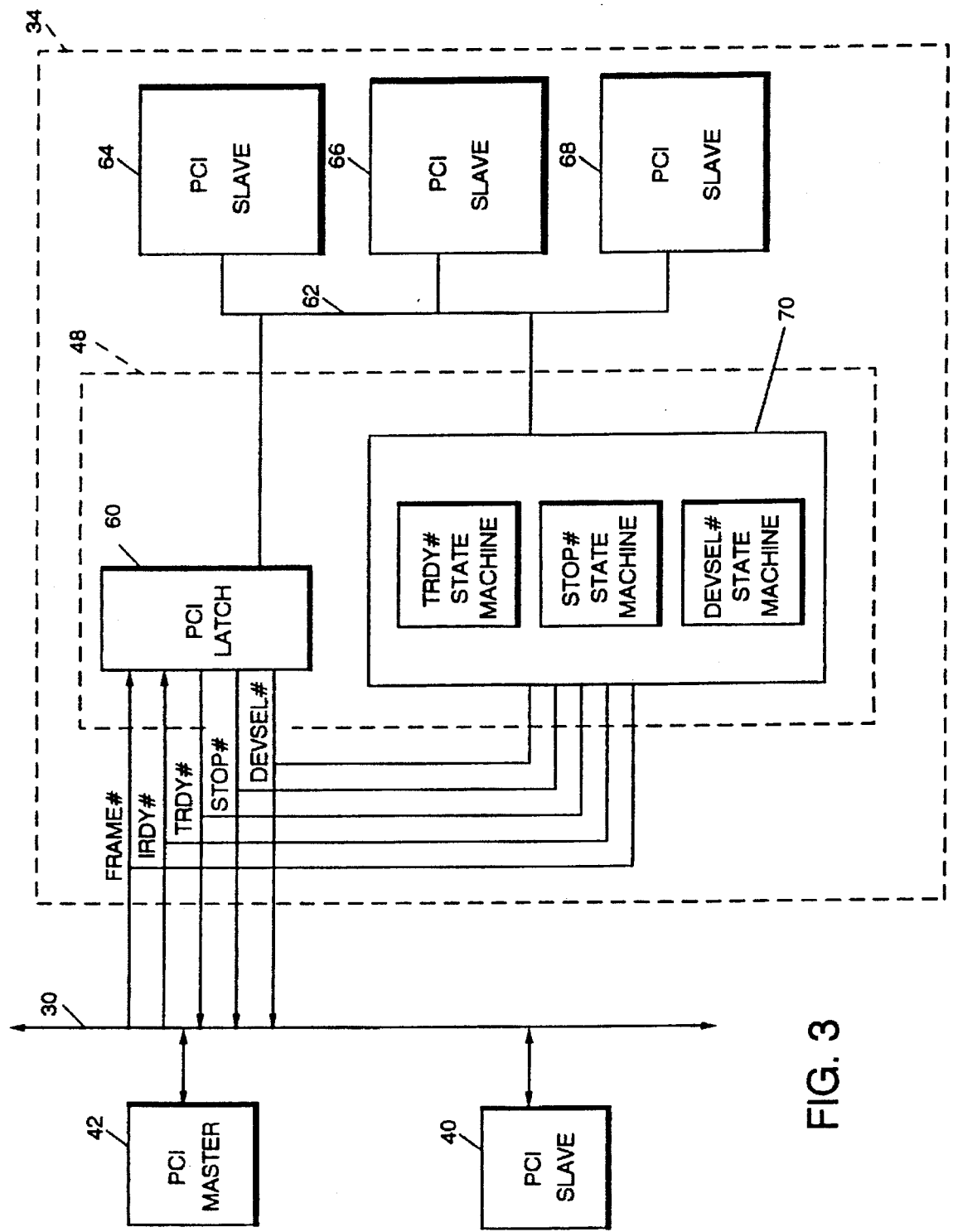
FIG. 3 is a block diagram of a bridge chip constructed in accordance with an embodiment of the present invention.
Figure 4A:
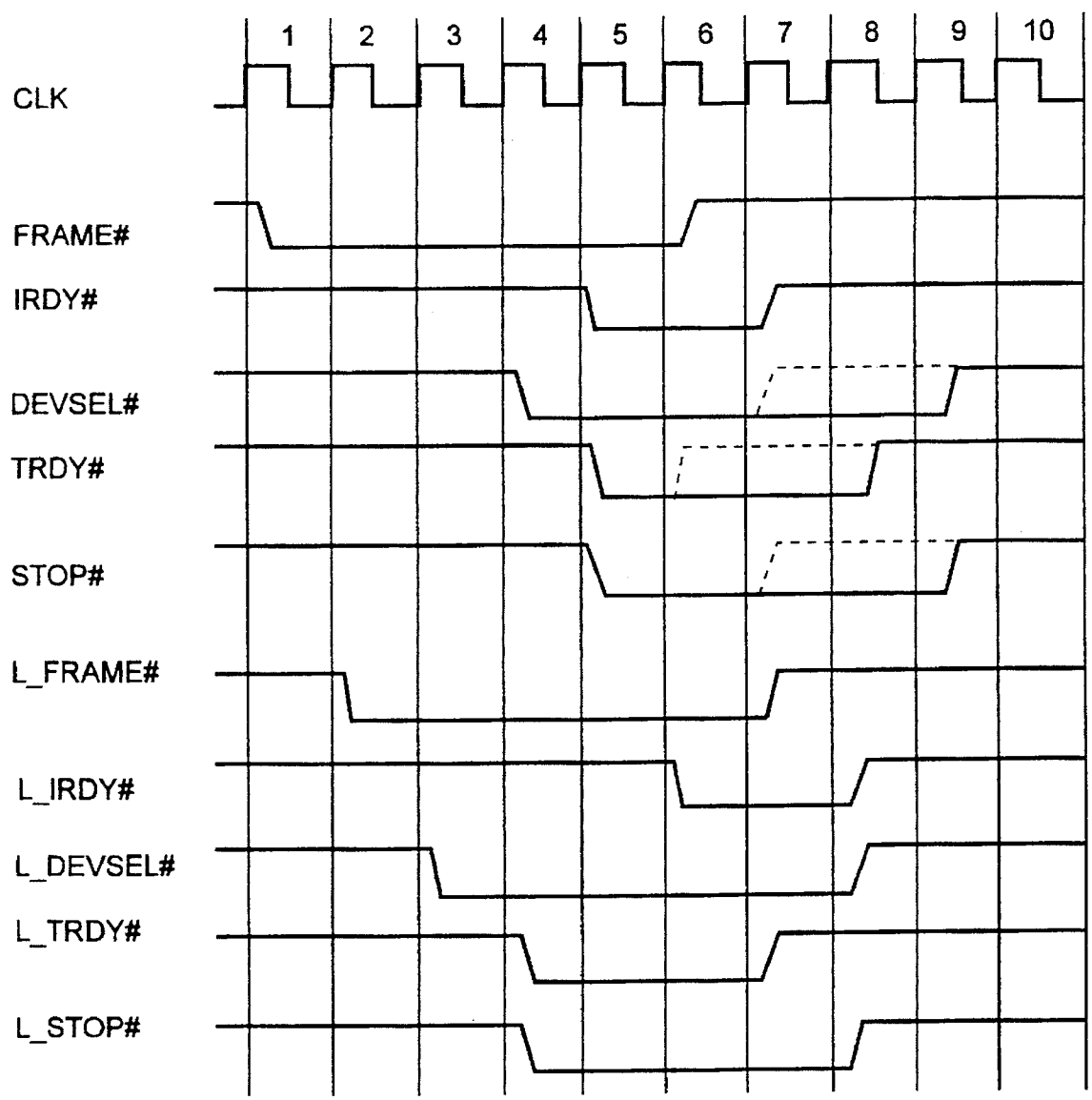
FIGS. 4a–f are timing diagrams of exemplary signal transfers between the PCI bus and the bridge chip of the present invention for different situations.
Figure 4B:
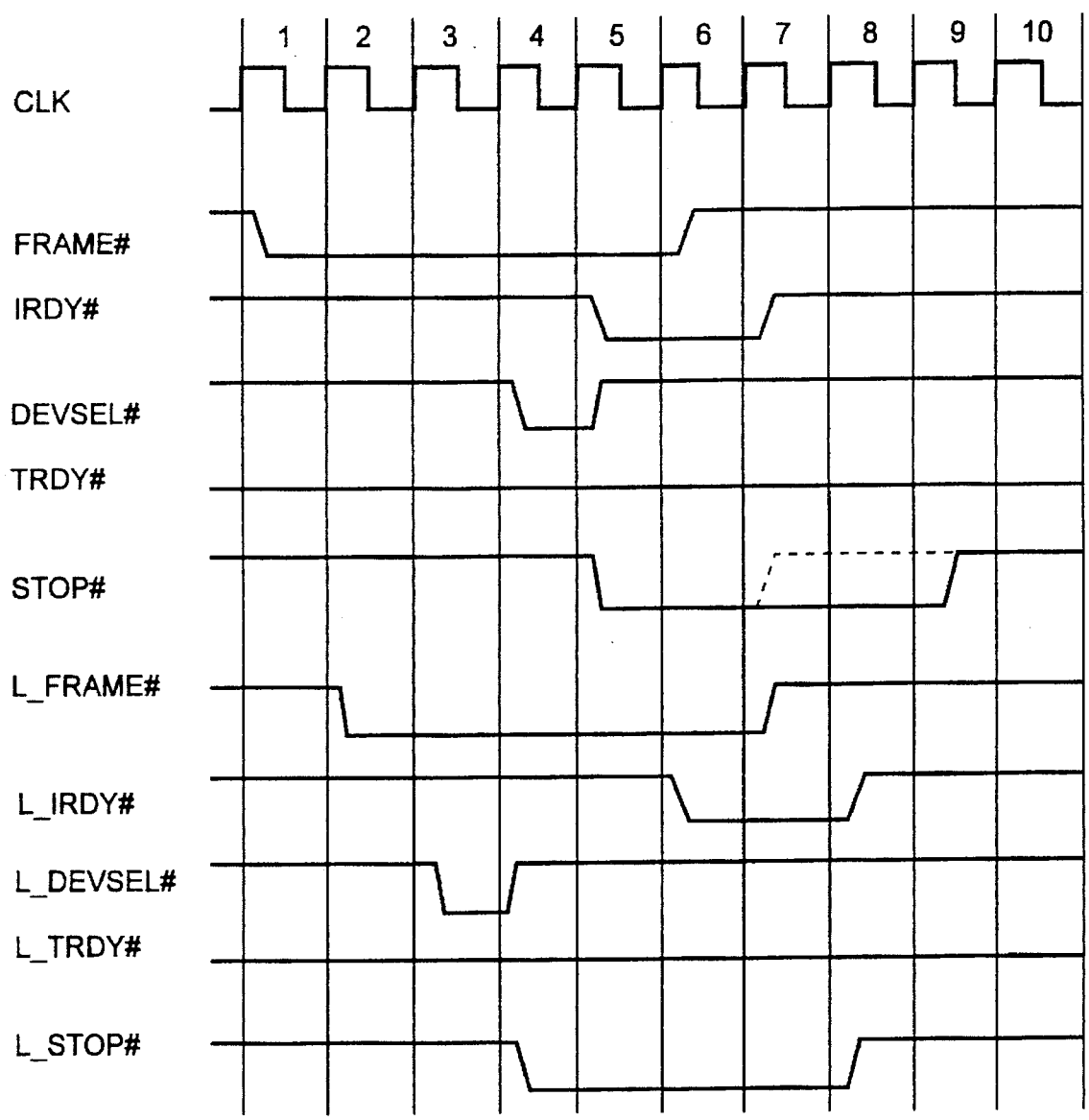
Figure 4C:
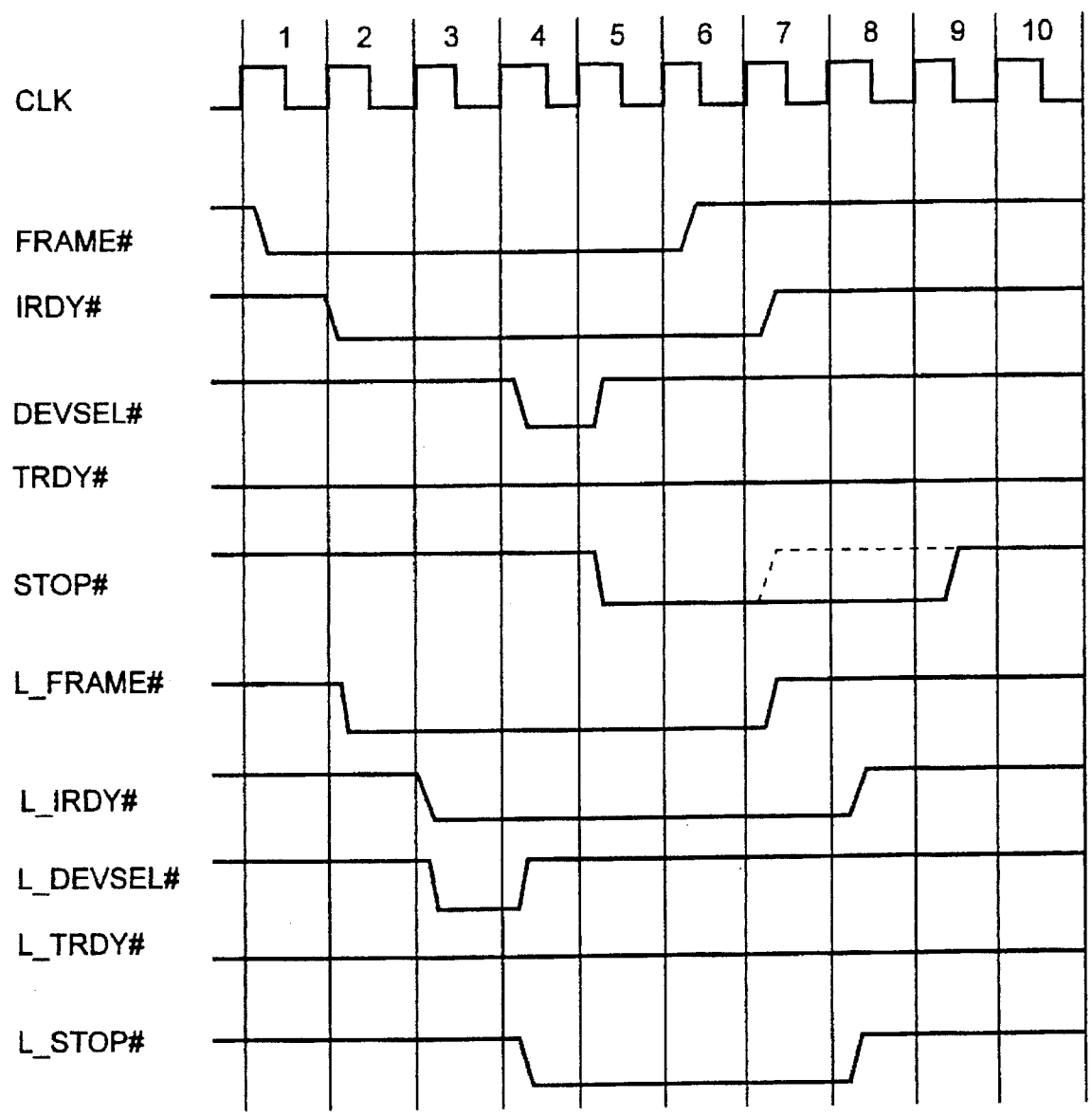
Figure 4D:
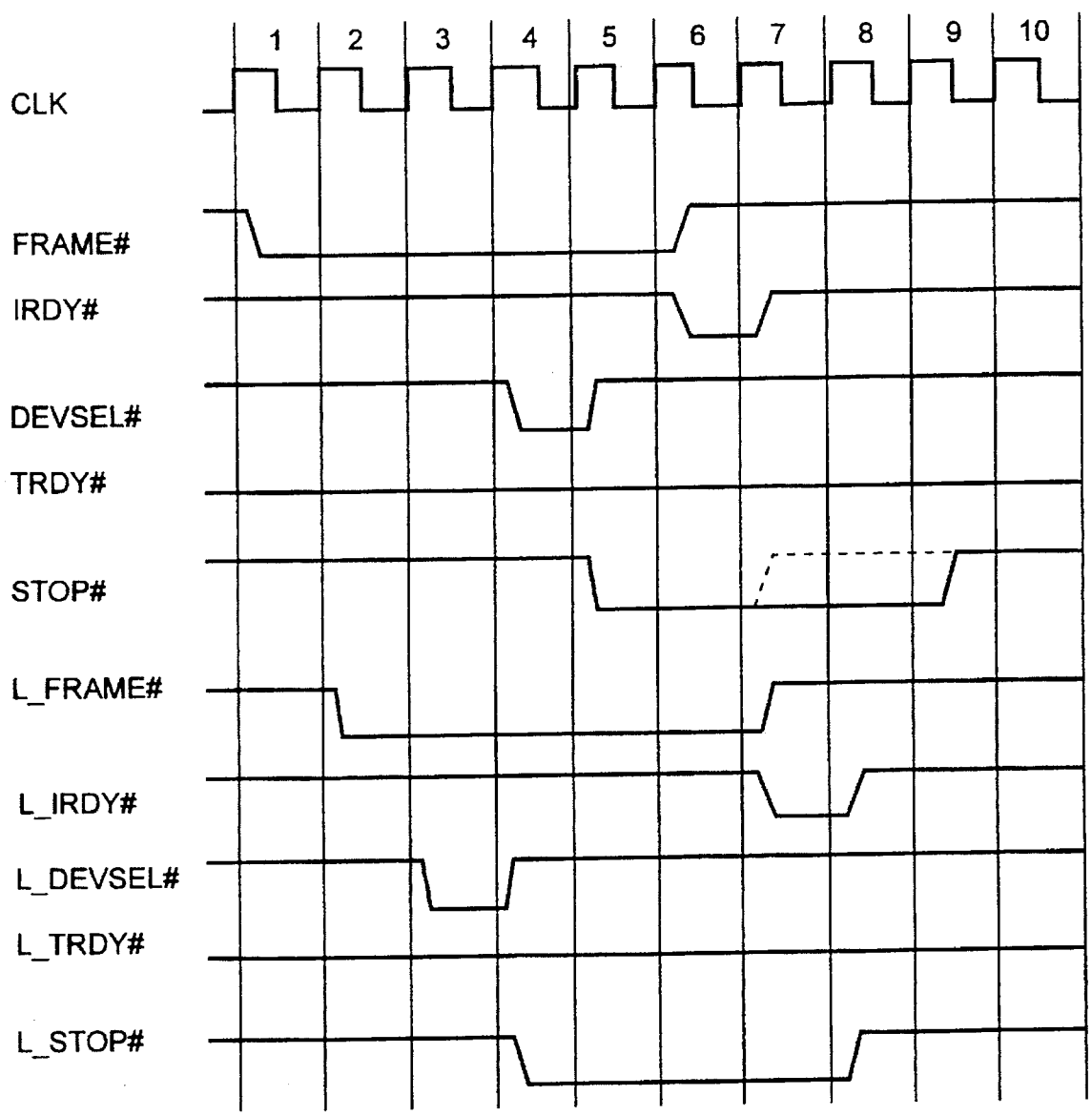
Figure 4E:
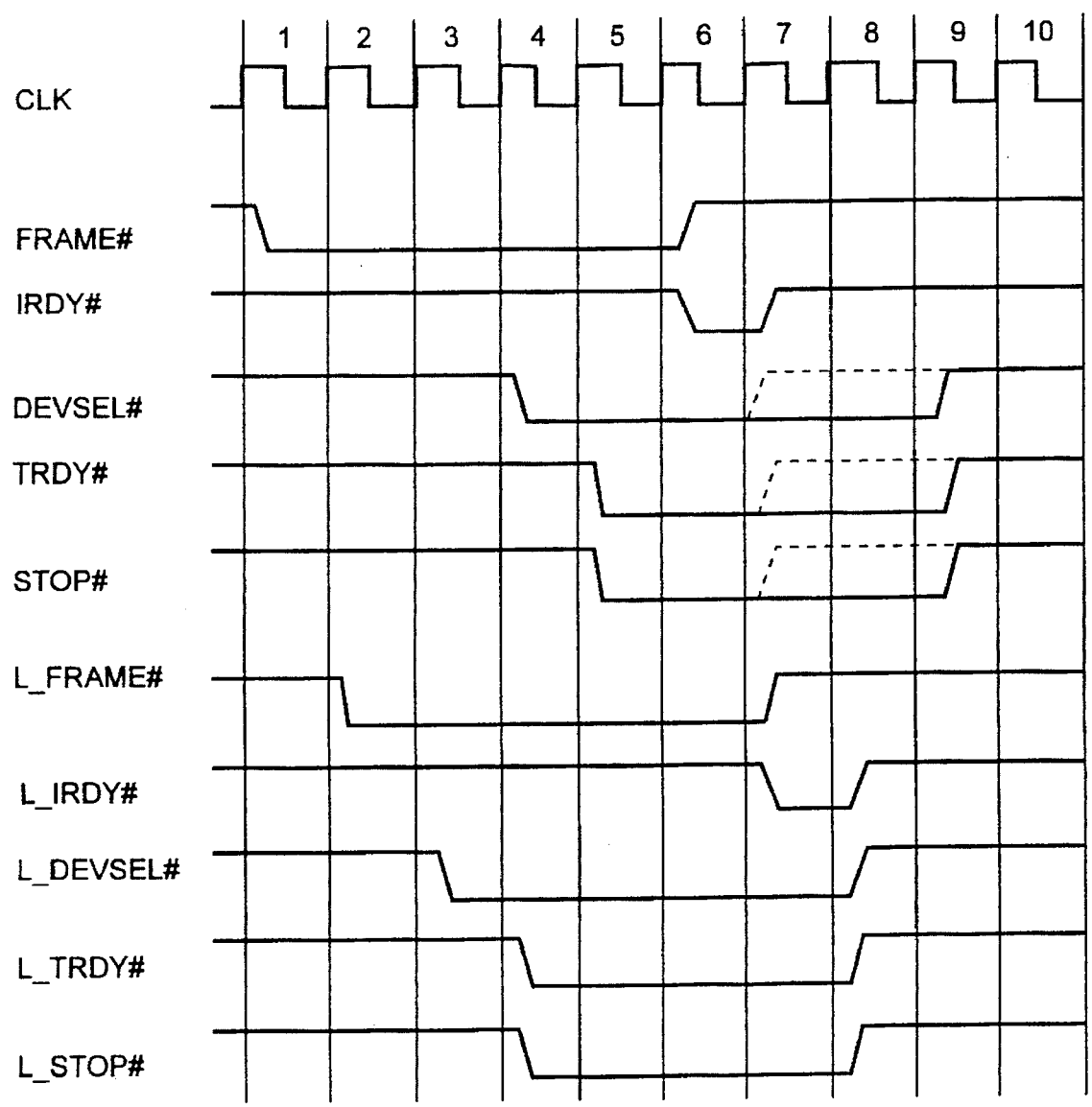
Figure 4F:
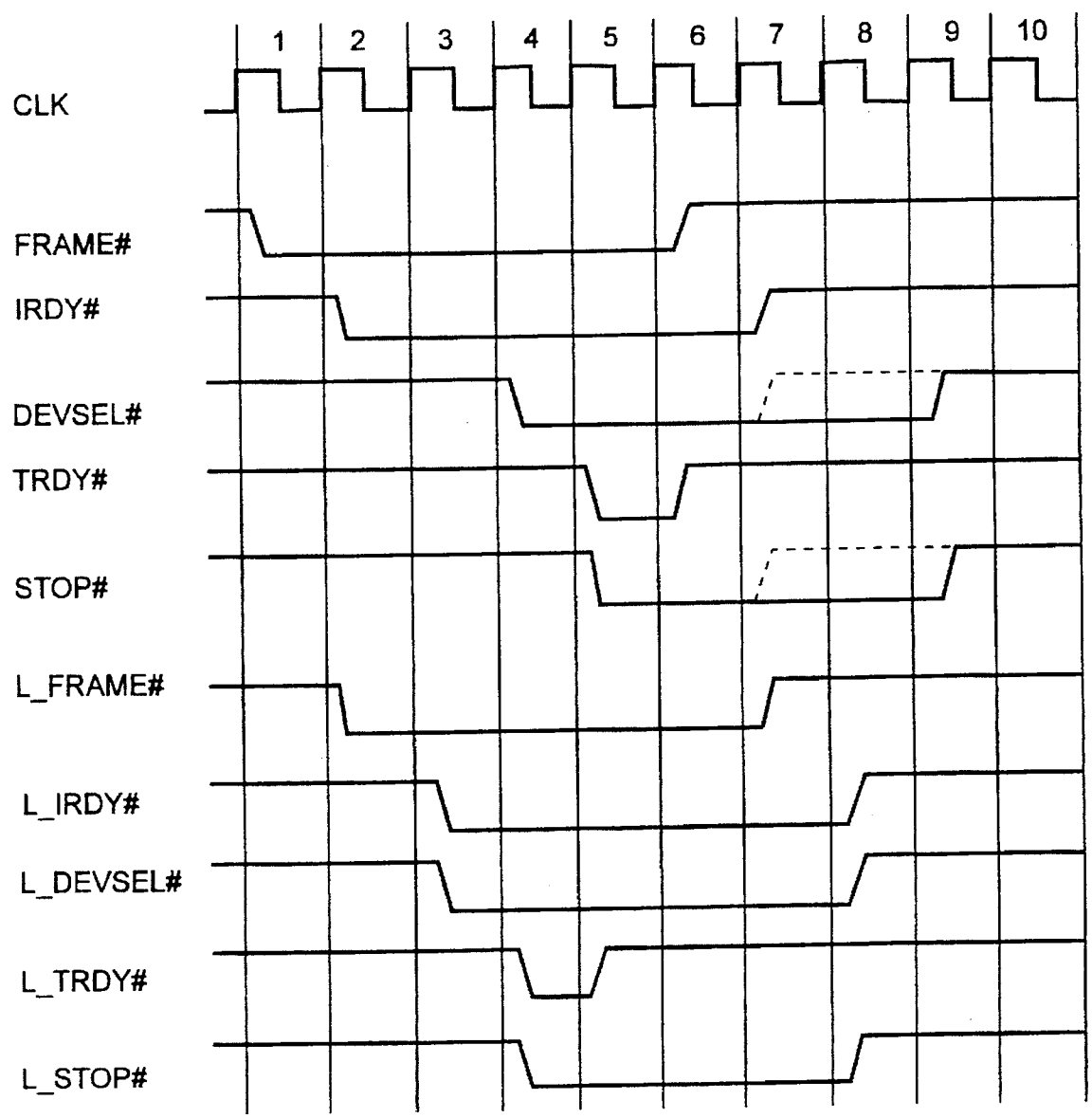

FIG. 3 is a block diagram of elements of the PCI interface 48 that allow the bridge chip 34 to be implemented in a slow technology and still respond according to the PCI protocol. It will be understood by those of ordinary skill in the art that the PCI interface 48 includes other elements for performing the PCI cycles/internal system bus cycles translation, but these other elements are not illustrated so as not to obscure the present invention.

The PCI interface 48 is coupled to a plurality of PCI slaves 64, 66, 68 located on the bridge chip 34. These PCI slaves 64-68 perform the various desired functions that can be imbedded in the bridge chip 34, such as scatter/gather, IDE interfacing, PCI arbitration, etc. Since the bridge chip 34 is implemented in slow technology to provide a reasonable cost chip, the PCI slaves 64-68 are also implemented in the slow technology and cannot normally detect and respond to unlatched control signals on the PCI bus 30. The PCI slaves 64-68 on the bridge chip 34 therefore require that the control signals to and from the PCI bus 30 be latched.

The latching of the signals by the PCI interface 48 to and from the PCI bus 30 is provided by a PCI latch 60, formed by conventional latches. The latch 60 is coupled to the PCI bus 30 to receive a frame signal (FRAME#), an initiator ready signal (IRDY#); and to send a target ready signal (TRDY#), a stop signal (STOP#), and a device select signal (DEVSEL#). The latch 60 is also coupled to an internal, latched PCI bus 62 and provides latched versions of the above signals on the latched PCI bus 62. The latched signals are designated as L_FRAME#, L_IRDY#, L_TRDY#, L_DEVSEL# and L_STOP#.

The latching of the signals in both directions adds a two clock latency to the communication cycles between the PCI master 42 and the PCI slaves 64-68. The PCI bus 30 is not designed to have a two clock latency and maintain the protocol.

In order to overcome the latency problem brought about by the need to latch the signals in both directions, the PCI latch 48 of the present invention is provided with a PCI interface logic device 70 that is coupled to the PCI bus 30. As will be described in more detail in the following, the PCI interface logic device 70 monitors the external PCI control signals and the slave control signals and drives the control signals on the PCI bus 30 according to the PCI bus protocol.

The configuration of the logic device 70 is specific to the particular bus with which the logic device 70 is being used, such as the example of the PCI bus 30 in this illustrative embodiment. A state machine is provided for each of the STOP#, DEVSEL#, and TRDY# signals for maintaining the PCI bus protocol. The configuration of the state machines to perform the functions of monitoring and driving the control signals according to the PCI bus protocol is readily accomplished by one of ordinary skill in the art.

Some of the problems that may arise due to the interfacing of the slaves 64-68 to the latched PCI bus 62 include: (1) slaves stopping attempted bursts when slave TRDY# is asserted with external FRAME# deasserted; (2) non-burst transfers; and (3) slaves stopping attempted bursts when slave TRDY# is asserted prior to external FRAME# deasserted, etc.

Although the PCI signals and bus protocol are well-known to those of ordinary skill in the art, the meaning of the signals that are shown in the timing diagrams of FIGS. 4a-f will be briefly described.

The FRAME# signal is asserted by a master (or "initiator") to indicate to the slaves that the master is starting a transaction.

The IRDY# signal (Initiator Ready) is asserted by a master to indicate that the master is ready to send or receive data.

The DEVSEL# (Device Select) signal is asserted by a slave to acknowledge to the master that the slave is aware that it is the device selected to perform the transaction with the master.

The TRDY# (Target Ready) signal is asserted by a slave to indicate that the slave (or "target") is ready to send or receive data.

The STOP# signal is asserted by a slave to indicate to a master that it is not able to handle a transaction.

In the exemplary embodiment of the present invention, the logic device 70 takes over control of the DEVSEL#, STOP#, and TRDY# signals (those signals sent from a slave) under six different circumstances. The first of these is when a master 42 tries to burst to a non-bursting slave (such as PCI slave 64) with a late IRDY#. The timing diagram for this situation is provided in FIG. 4a. (In all of the timing diagrams, the prefix "L_" means latched signals internal to the bridge chip 34, whereas no prefix indicates an unlatched signal external to the bridge chip 34. Also, a dashed line indicates a signal that has been driven by the logic device 70.) Since the PCI slave 64 does not know whether the transfer is a burst transfer or a non-burst transfer, the PCI slave 64 asserts L_STOP# in the fourth clock of the cycle. The STOP# signal is sent off chip to the PCI bus 30 in the fifth clock of the cycle. In order to send data, the master 42 drives the IRDY# signal active. The master 42 also sees the asserted STOP# on the sixth clock and therefore drives FRAME# inactive to terminate the cycle. The signal TRDY# must only be asserted for one clock since the PCI slave 64 does not support a burst transaction. Therefore, the PCI interface logic device 70 deasserts TRDY# on the sixth clock. After the FRAME# is deasserted, the PCI protocol requires that DEVSEL#, TRDY# and STOP# (the slave signals) all be deasserted. The PCI protocol therefore requires that the STOP# and DEVSEL# signals be deasserted in the clock after the deassertion of FRAME#, i.e. in the seventh clock. Without the PCI interface logic device 70 of the present invention, these signals would not be driven inactive until the ninth clock, since the latched $L_{13}$ FRAME# signal is not seen by the PCI slave 64 until the seventh clock, responded to in the eighth clock, and sent off chip in the ninth clock. The PCI slave 64 thus does not become aware that the cycle has to be terminated in sufficient time to respond according to the PCI bus protocol.

The PCI interface logic device 70, which is monitoring the unlatched (external) control signals, recognizes the inactive FRAME# signal as a circumstance requiring termination of the cycle. Accordingly, the PCI interface logic device 70 drives the STOP#, DEVSEL# and TRDY# inactive in the seventh clock thereby maintaining the PCI bus protocol.

The operation of the PCI interface logic 70 to drive the control signals in the other five circumstances should now be apparent from the above description and the remaining timing diagrams. The situation in FIG. 4b, for example, occurs when a master 42 tries to burst to a non-bursting slave 64 with late IRDY# and the cycle must be terminated with a target abort. A target abort is defined by the slave deasserting L_DEVSEL# and asserting L_STOP#. After receiving the STOP# signal in the fifth clock, the FRAME#signal is driven inactive by the master. The STOP#signal must be driven inactive by the PCI interface logic device 70 in the next clock (DEVSEL# and TRDY# are already inactive) to maintain the bus protocol.

The third circumstance (FIG. 4c) occurs when the master 42 is bursting with an immediate IRDY#, and the PCI slave 64 performs a target abort by driving L_DEVSEL# inactive and L_STOP# active. In this case, the PCI bus protocol requires that the FRAME# signal be driven active (performed by the master 42) and the STOP# signal be driven inactive (by the PCI interface logic device 70) one clock after the FRAME# signal is driven inactive after the target abort. The PCI interface logic device 70, which has been monitoring the unlatched signals, needs to drive only the STOP# signal to inactive since the DEVSEL# and TRDY# are already inactive.

The fourth circumstance (FIG. 4d) occurs when the master 42 performs a non-bursting transfer with a late IRDY#signal and there is a target abort. In this case, the FRAME# signal is driven inactive by the master 42 after the master 42 sees the STOP# signal active. Once again, the STOP# signal is driven inactive by the PCI interface logic device 70 one clock after the FRAME# is deasserted in order to maintain the bus protocol. Otherwise, the L_STOP# signal would not be driven inactive on the PCI bus 30 for another two clock cycles, which would violate the PCI bus protocol.

The fifth circumstance (FIG. 4e) occurs when the master 42 performs a non-bursting transfer and there is no target abort. In this case, the PCI slave 64 asserts L_STOP# in the fourth clock, seen by the master 42 as STOP# in the fifth clock. The master 42 responds by deasserting FRAME# in the sixth clock. The STOP#, TRDY# and DEVSEL# signals must all be deasserted in the seventh clock since the FRAME# signal was deasserted in the sixth clock. Since the PCI slave 64 cannot drive these signals inactive soon enough, due to the latching of the signals, the PCI interface logic device 70 drives the signals inactive to maintain the PCI bus protocol.

The sixth circumstance (FIG. 4f) occurs when the master performs a bursting transfer to a non-bursting slave 64, with an immediate IRDY# signal. The L_STOP# signal is asserted by the PCI slave 64 in the fourth clock, seen by the master 42 in the fifth clock which causes the master to deassert FRAME#. After FRAME# has been deasserted, the DEVSEL# and STOP# have to be driven inactive in the sixth clock to maintain the PCI bus protocol, the TRDY# signal already being inactive in this case.

As can be appreciated by the above examples, the present invention provides a PCI interface logic device 70 that monitors the unlatched, external control signals and under certain circumstances, takes over the task of driving the external slave signals on the PCI bus 30 according to the PCI bus protocol. This allows the bridge chip 34, containing the PCI slaves 64–68, to be implemented in a slow, relatively inexpensive technology using latched signals, while maintaining the PCI bus protocol.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer system comprising:
 a first bus;
 a second bus carrying control signals and having a specified bus protocol;
 at least one master coupled to the second bus;
 a bridge coupled between the first and second buses for interfacing the first and second buses, the bridge including:
  a third bus carrying latched control signals received from the second bus;
  at least one slave coupled to the third bus and receiving latched control signals from the third bus;
  a latch coupled between the second and third buses and latching control signals sent from the second bus to the third bus, and latching control signals sent from the third bus to the second bus;
  a logic device coupled between the second and third buses, the logic device sending, in response to receiving predetermined unlatched master control signals from the master coupled to the second bus, predetermined unlatched slave control signals to the master on the second bus, wherein the predetermined unlatched master control signals are for a predetermined type of data transfer between the master coupled to the second bus and the slave coupled to the third bus.

2. The system of claim 1, wherein the second bus is a peripheral controller interconnect (PCI) bus, and the bus protocol is a PCI bus protocol.

3. The system of claim 2, wherein the slave is a PCI slave.

4. The system of claim 3, wherein the third bus is an internal latched PCI bus.

5. The system of claim 4, wherein the control signals include a target ready signal, a device select signal and a stop signal, the logic device driving at least one of these control signals in response to the certain predetermined states of the monitored control signals.

6. The system of claim 5, wherein the monitored control signals include a frame signal and an initiator ready signal.

7. The system of claim 6, wherein the bridge is formed by slow CMOS technology.

8. The system of claim 5, wherein the logic device includes a separate state machine for each of the respective target ready, device select and stop signals.

9. The system of claim 6, wherein the predetermined state includes a deassertion of the frame signal, the logic device driving any active target ready, device select and stop signals inactive in response to the deassertion of the frame signal.

10. A bridge coupled between first and second buses for interfacing the first and second buses, the second bus carrying control signals and having a master coupled to the bus and a specified bus protocol, the bridge comprising:

a third bus carrying latched control signals received from the second bus;

at least one slave coupled to the third bus and receiving latched control signals from the third bus;

a latch coupled between the second and third buses and latching control signals sent from the second bus to third bus, and latching control signals sent from the third bus to the second bus;

a logic device coupled between the second and third buses, the logic device sending, in response to receiving predetermined unlatched master control signals from the master coupled to the second bus, predetermined unlatched slave control signals to the master on the second bus, wherein the predetermined unlatched master control signals are for a predetermined type of data transfer between the master coupled to the second bus and the slave coupled to the third bus.

11. The bridge of claim 10, wherein the second bus is a peripheral controller interconnect (PCI) bus, and the bus protocol is a PCI bus protocol.

12. The bridge of claim 11, wherein the slave is a PCI slave.

13. The bridge of claim 12, wherein the third bus is an internal latched PCI bus.

14. The bridge of claim 13, wherein the control signals include a target ready signal, a device select signal and a stop signal, the logic device driving at least one of these control signals in response to the certain predetermined states of the monitored control signals.

15. The bridge of claim 14, wherein the monitored control signals include a frame signal and an initiator ready signal.

16. The system of claim 15, wherein the bridge is formed by slow CMOS technology.

17. The bridge of claim 14, wherein the logic device includes a separate state machine for each of the respective target ready, device select and stop signals.

18. The bridge of claim 15, wherein the predetermined state includes a deassertion of the frame signal, the logic device driving any active target ready, device select and stop signals inactive in response to the deassertion of the frame signal.

* * * * *